United States Patent [19]
Antos et al.

[11] Patent Number: 5,746,466
[45] Date of Patent: May 5, 1998

[54] FLUSH SERVICE DOOR FOR RV

[75] Inventors: John M. Antos, Ann Arbor; John R. Selina; David B. Cameron, both of Brighton; James M. Byrne, Ann Arbor, all of Mich.; Gerard Cornelis Rijn; Marinus Antonius Ros, both of Etten-Leur, Netherlands

[73] Assignee: Thetford Corporation, Ann Arbor, Mich.

[21] Appl. No.: 626,564

[22] Filed: Apr. 2, 1996

[51] Int. Cl.$^6$ .................................................... B60R 5/00
[52] U.S. Cl. ............................. 296/37.1; 49/383; 296/218
[58] Field of Search ............................ 296/37.1, 218; 49/383, 400; 292/DIG. 43

[56] References Cited

U.S. PATENT DOCUMENTS

| | | | |
|---|---|---|---|
| 4,237,709 | 12/1980 | Krügener et al. | 292/DIG. 43 |
| 4,783,116 | 11/1988 | Hough | 296/218 |
| 4,906,033 | 3/1990 | Sargent et al. | 296/37.1 |
| 4,908,885 | 3/1990 | Antos . | |

*Primary Examiner*—Jesus D. Sotelo
*Attorney, Agent, or Firm*—Harness, Dickey & Pierce, P.L.C.

[57] ABSTRACT

A door assembly to be attached to a cutout in the side wall of a recreational vehicle for alternatively closing off and providing access to an internal compartment. A body frame is attached to the cut out in the side wall. A door panel is attached by a hinge to the body frame. A pair of push button latch mechanisms, one of which contains an integrated lock, retains the door panel in the closed position. The locking latch may be switched to the locked position when the door is open, automatically locking the door when it is closed. A flexible seal, incorporating a double sealing surface feature, is attached to the perimeter of the door and seats against the frame when the door is closed. The door panel includes a separate door wall and inner and outer door frames which are joined by a retaining clip. The metal retaining clip has a return bent upon itself shape and pointed wedge shaped upset portions for joining the outer and inner door frames. The hinge is formed by portions of the frame and door panel that are flush with or recessed from the maximum protrusion distance of the door panel from the side wall, joined by a hinge pin that is not accessible when the door is closed and which is designed to break away if destructive forces are place on the door assembly.

8 Claims, 5 Drawing Sheets

FLUSH SERVICE DOOR FOR RV

BACKGROUND AND SUMMARY OF THE INVENTION

This invention is related to doors on recreational vehicles (RVs) which are used to alternatively seal off and provide access to internal compartments within RVs and more particularly to an improved type of flush mounted service door assembly for recreational vehicles which offers substantial appearance, assembly and performance advantages over conventional RV door assemblies.

Conventional door assemblies for recreational vehicles have generally been of relatively crude design. These door assemblies have been comparatively difficult for operators to use. They have been subject to leakage of materials into and out of the internal compartment and have not been very weather-tight. They have also been relatively difficult to assemble. The hinge and handle mechanisms have typically protruded from the surface of the body panel and detracted from the overall appearance of the vehicle. Prior RV door assemblies have also been relatively easy to break into, allowing thieves to gain access to the contents of the compartment, such as luggage, equipment and cargo.

It is the principal object of the present invention to provide an improved design of RV service door assembly which is easy and convenient for operators to use, substantially inhibits leakage into and out of the internal compartment and is very weather-tight, is comparatively easy to assemble, is difficult to break into and which is mounted substantially flush to the vehicle exterior.

The inventive door assembly consists of a body frame, a door panel, including push button latch mechanisms (one of which contains an integral lock assembly) and a peripheral seal, and hinges. The body frame is fastened to a opening or cutout in the body of the RV and consists of inner and outer body frame components which sandwich the RV body material. Two hinges, located on the lower portion of the door assembly, movably connect the body frame to the door panel. The hinge allows the door panel to swing open, allowing access to the internal compartment within the recreational vehicle. The hinges are substantially flush mounted to the remainder of the door assembly and the hinge pins are covered and not accessible when the door is closed. The hinge pins are purposely made of material which is designed to yield and break away so as to protect the door panel and body frame from damage if destructive forces are placed on the door panel, the body frame and the hinge pins. When the door is opened, the door panel rotates approximately 180° about the hinge pins and rests against the wall of the RV. Gravitational forces stabilize the door against the wall of the RV when the door is in the open position.

The door panel consists of inner and outer door frame components which sandwich a door wall and are joined by retaining clips. A pair of push button activated latches are installed in the upper corners of the door panel. These latches engage lip sections of the outer body frame and secure the door panel to the body frame when the door is closed. These latches may contain integral lock assemblies which prevent the push button from being depressed and the door released unless the lock assembly is in the unlocked position. The latches also allow the door to be automatically latched when the door is shut, which makes closing the door a simple operation that can be accomplished with one hand. The integral lock assembly in the latch may also be locked when the door is in the open position. When the door is then shut, the lock assembly prohibits the door from being reopened until the lock assembly has been unlocked and the push button has been depressed.

An elastomeric seal incorporating inner and outer spaced-apart flexible sections is attached to the outer perimeter of the door panel. This seal contacts the body frame when the door is closed and prevents external contaminates, such as rain, dirt or insects, from entering the internal compartment as well as preventing materials contained within the compartment, such as cargo or septic waste, from escaping the compartment. This seal provides two effective sealing surfaces when it is compressed as the door is closed and the seal also tends to urge the door panel into the open position when the push button latches have been released.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
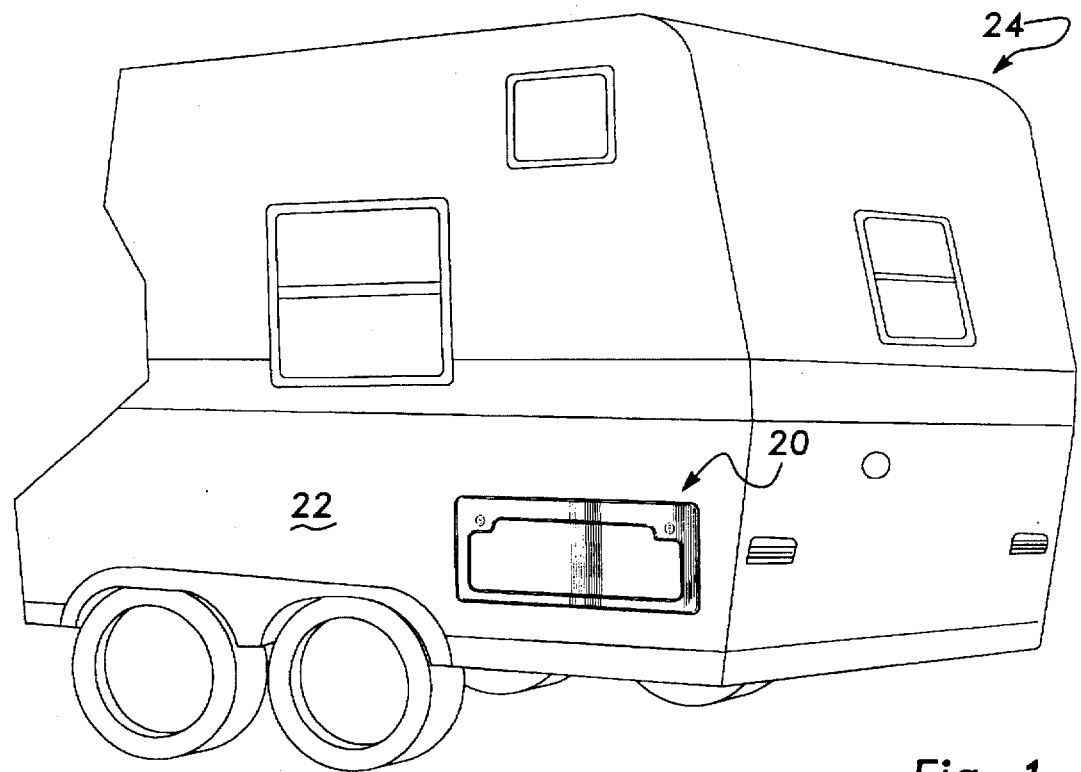
FIG. 1 is a fragmentary perspective exterior view of a portion of a recreational vehicle equipped with one of the subject door assemblies.

A RV door assembly in accordance with this invention is shown in a completed and installed condition in FIG. 1 and is generally designated by reference number 20. Door assembly 20 is installed in a cutout or opening in a wall 22 of a recreational vehicle 24. Recreational vehicle 24 can be a motor home, a travel trailer, a camper or any type of vehicle, trailer or component thereof equipped for similar purposes. Door assembly 20 both provides access to and seals off an internal compartment within recreational vehicle 24. This compartment may be used for occupant storage of luggage, cargo, recreational equipment and the like or it may contain RV component machinery and equipment such as electrical system components or plumbing system components. Because recreational vehicles are intended to be readily transportable, their external dimensions must be limited. To allow access to all of the readily available space within the external shell, several such doors are often necessary or desirable.

Figure 2:
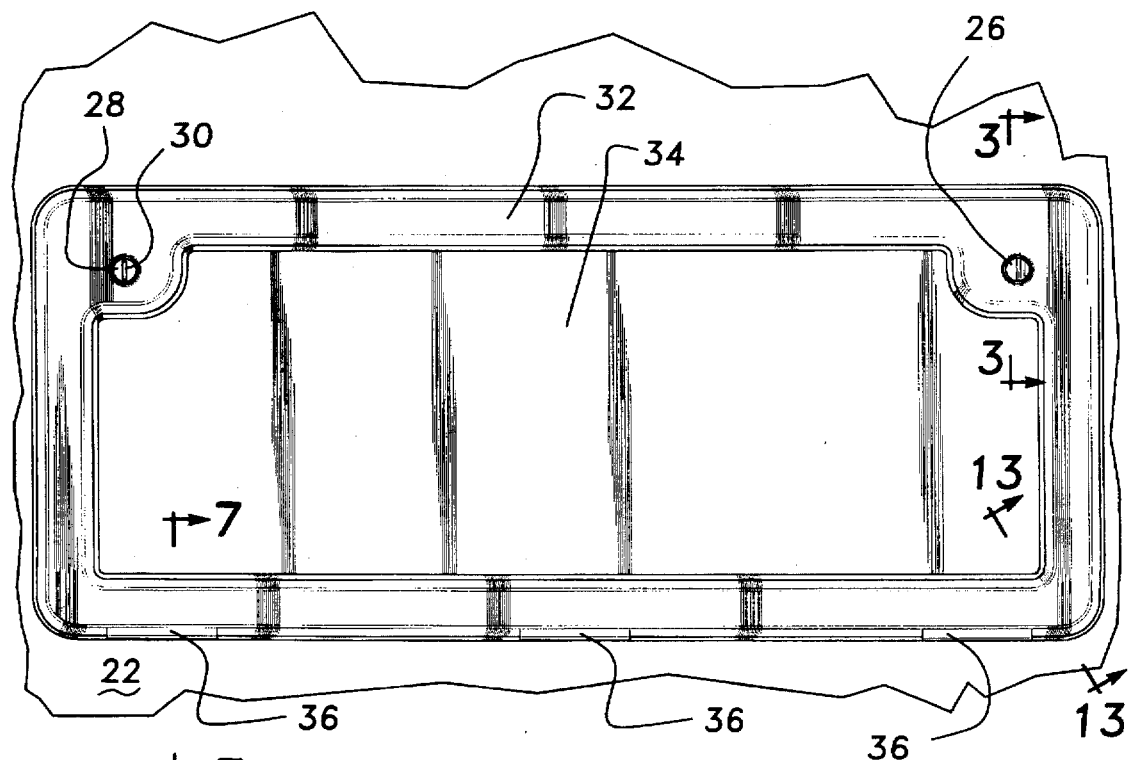
FIG. 2 is a closeup fragmentary view of the recreational vehicle in FIG. 1 showing exterior features of the subject door assembly.

FIG. 2 shows a close up view of the exterior of the installed door assembly 20 surrounded by RV wall 22. Push buttons, 26 and 28, which are components of the push button latch assemblies, are located near the top opposing corners of the door assembly 20. Push button 28 contains a key hole 30 that indicates that this push button latch mechanism contains an integral lock mechanism. Door assembly 20 includes an outer door frame 32 on which a door wall 34 is mounted. Door assembly 20 also includes an outer body frame 36, only a portion of which is visible in FIG. 2. To obtain the substantially flush appearance of door assembly 20, RV wall 22 and door wall 34 are in approximate planar alignment. Outer door frame 32 and the exposed section of outer body frame 36 are slightly elevated away from the surface of RV wall 22 and door wall 34, but this elevation distance is very limited (approximately 13 millimeters in this embodiment) and the edges of these elevated components are rounded to cause them to visually blend into RV wall 22 and door wall 34. These rounded edges also reduce the likelihood of shadows being created that could accent the presence of the door. It can also be seen in this figure that when door assembly 20 is in the closed position, there are no exposed fasteners.

Figures 3, 4:
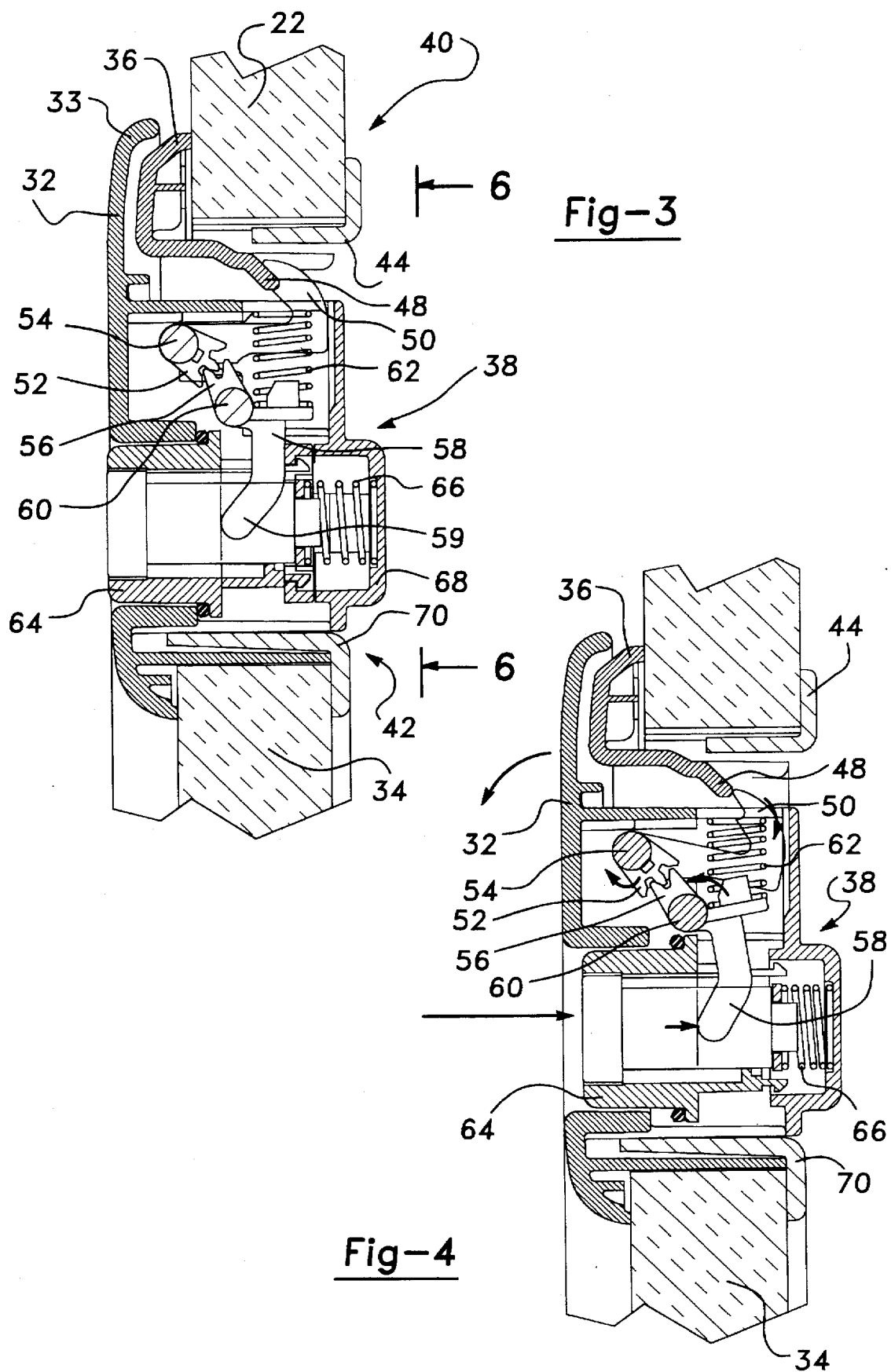
FIG. 3 is a fragmentary cross sectional view of the door assembly in the closed position in the vicinity of a push button latch mechanism.
FIG. 4 is a fragmentary cross sectional view of the door assembly from FIG. 3 as the push button is being depressed.

FIG. 3 provides a close up cross sectional view of a portion of door assembly 20 including particularly a latch assembly 38 which is incorporated into a door panel 42. Door panel 42 is attached to a body frame 40. Body frame 40 consists of two components, outer body frame 36 and inner body frame 44. Outer body frame 36 and inner body frame 44 sandwich RV wall 22 and provide a stable opening within which door panel 42 operates. Outer body frame 36 is first placed over the cutout and into contact with RV wall 22. Inner body frame 44 is then laid over outer body frame 36 and fastened to RV wall 22, typically with threaded fasteners such as screws. A lip section 48 of outer body frame 36 is engaged by a claw 50 in latch assembly 38 when door panel 42 is closed.

Door panel 42 includes all of the components of door assembly 20 that move when the door is opened and closed, such as outer door frame 32, door wall 34, and the components of latch assembly 38.

Latch assembly 38 includes claw 50, a push button 64, and other components which allow claw 50 to be operatively connected to push button 64. Because there is no keyhole visible in this figure, push button 64 in FIG. 3 is part of a non-locking latch mechanism like push button 26 from FIG. 2. Claw 50 is connected to a three toothed gear 52 and they both rotate about a claw pivot 54. Three toothed gear 52 meshes with a two toothed gear 56. Two toothed gear 56 is connected to an actuator arm 58 and they both rotate about an actuator pivot 60. An actuator spring 62 in compression urges an actuator arm end 59 into the forward position which, through the rotational movement of meshing two toothed gear 56 and three toothed gear 52, causes claw 50 to be urged into the upward position and into contact with the lip section 48 of outer body frame 36. A push button 64 is used by the operator to move the actuator arm end 59 rearward and thus open latch assembly 38. Push button spring 66 in compression urges push button 64 outward assuring that latch assembly 38 remains in the latched position when no external forces are applied to push button 64 or claw 50. The components of latch assembly 38 are housed in outer door frame 32 and a latch housing 68. Outer door frame 32 and an inner door frame 70 sandwich door wall 34 and are fastened by a retaining clip which is not shown in this figure.

Outer door frame 32 has a curved periphery portion 33 that has at least three distinct purposes. While the inventive door assembly 20 has a flexible seal around the entire periphery of the outer door frame 32 (as discussed below but not shown in this figure), the curved periphery portion 33 of the outer door frame 32 also helps to deflect rain, dirt and other foreign objects away from the interior of door assembly 20 and latch assembly 38 when the door is closed. Another purpose of the curved periphery portion 33 is to provide a visual transition region from the slightly raised outer door frame 32 to RV wall 22 and to reduce the likelihood of shadows being created that could call attention to the presence of the door. A third purpose of curved periphery portion 33 is to make it difficult to insert a prying tool such as a screwdriver or crowbar between outer door frame 32 and outer body frame 36. A thief attempting to force open locked door assembly 20 would probably first try using a prying tool such as a screwdriver or crowbar to gain access to the inner compartment. Because the curved periphery portion 33 of outer door frame 32 and outer body frame 36 fit quite closely around the perimeter of door panel 42, and because the gap between the two components is angled toward RV wall 22, it is difficult to insert a common prying tool such as a screwdriver or a crowbar into this area and attempt to pry open door assembly 20.

FIG. 4 demonstrates the actuation of latch assembly 38. Push button 64 is depressed by the operator compressing push button spring 66 and causing actuator arm end 59 to move rearward. This rearward movement of actuator arm end 59 causes actuator arm 58 to rotate about actuator pivot 60. This movement also compresses actuator spring 62 and rotates two toothed gear 56 about actuator pivot 60. The rotational movement of two toothed gear 56 causes a simultaneous meshing rotation of three toothed gear 52 and claw 50 about claw pivot 54. The rotation of claw 50 about claw pivot 54 causes claw 50 to gradually lower and move out of engagement with lip section 48 of outer body frame 36.

Figure 5:
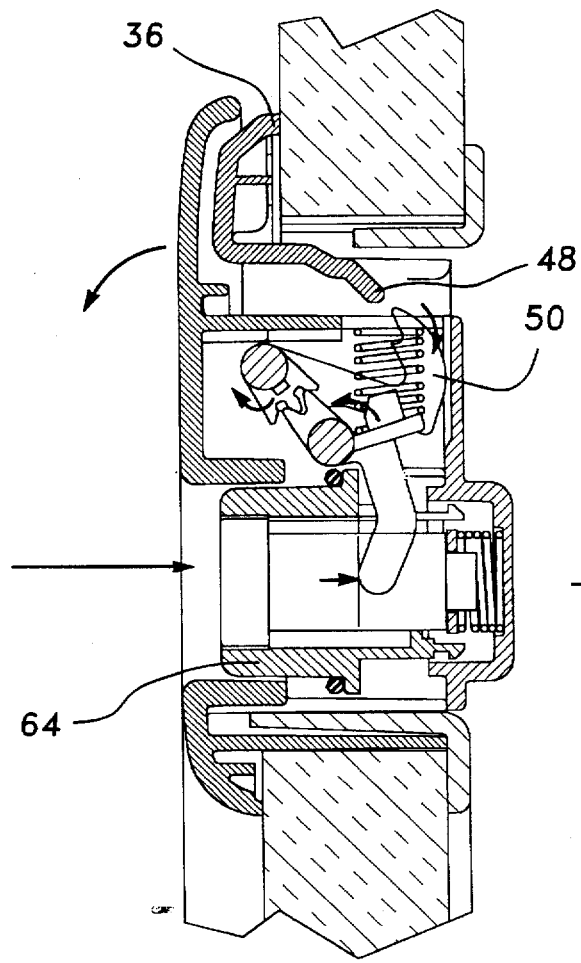
FIG. 5 is a fragmentary cross sectional view of the door assembly from FIG. 3 after the push button has been depressed to the point that the latch has been released.

In FIG. 5, push button 64 has been sufficiently depressed to rotate claw 50 completely out of engagement with lip section 48 of outer body frame 36, allowing the door to open.

Figure 6:
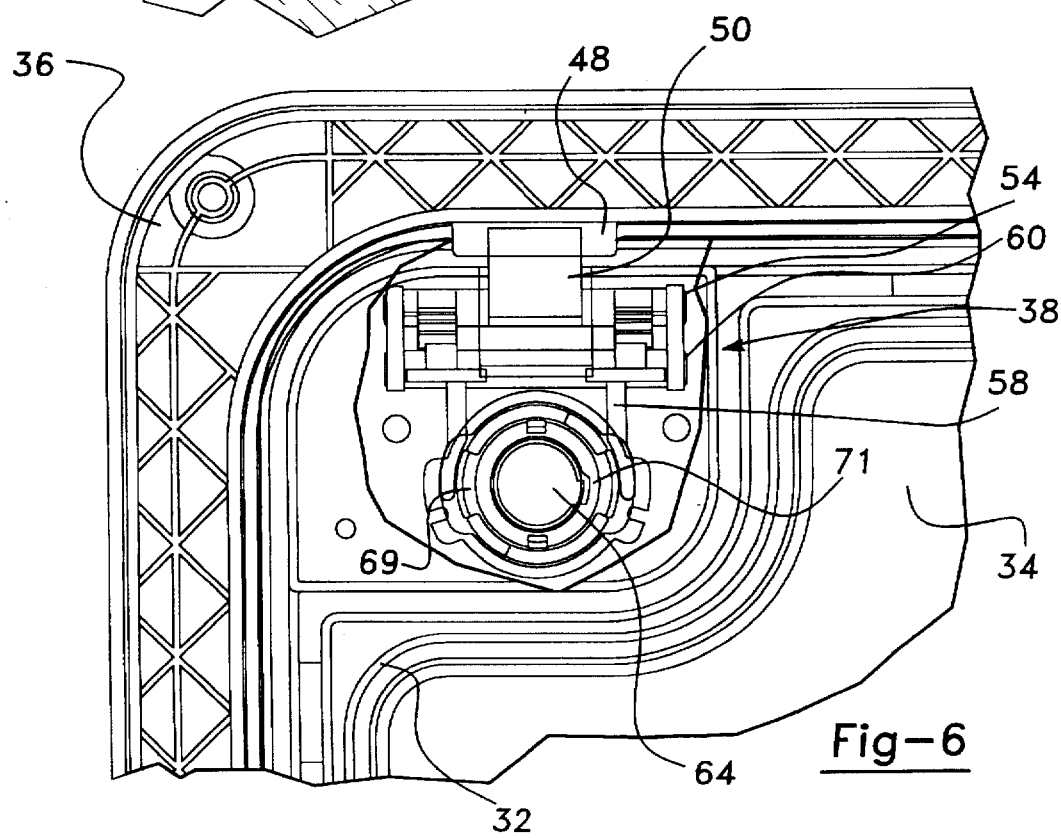
FIG. 6 is a fragmentary cross sectional view of the body frame and door panel that contains a cut out highlighting internal components of the push button latch assembly.

FIG. 6 shows a cut-away view of outer body frame 36, latch assembly 38, outer door frame 32, and door wall 34, when door assembly 20 is in the closed position. Claw 50 engages lip section 48 of outer body frame 36. Push button 64 is in contact with actuator arm 58 which is pivotally connected to actuator pivot 60. The motion of actuator arm 58 is transmitted by meshing two toothed and three toothed gears (not shown) to produce a corresponding rotation in claw 50 about claw pivot 54.

In the version of the latch assembly 38 that incorporates an integral lock assembly, a lock plate 69 is connected to a keyed cylinder 71 contained within latch assembly 38. In the unlocked position, the lock plate 69 allows push button 64 to be freely depressed. In the locked position, the lock plate 69 is rotated and due to the physical interference between the lock plate and the other components of the mechanism, the lock plate prohibits push button 64 from being depressed and latch assembly 38 from being released.

Figure 7:
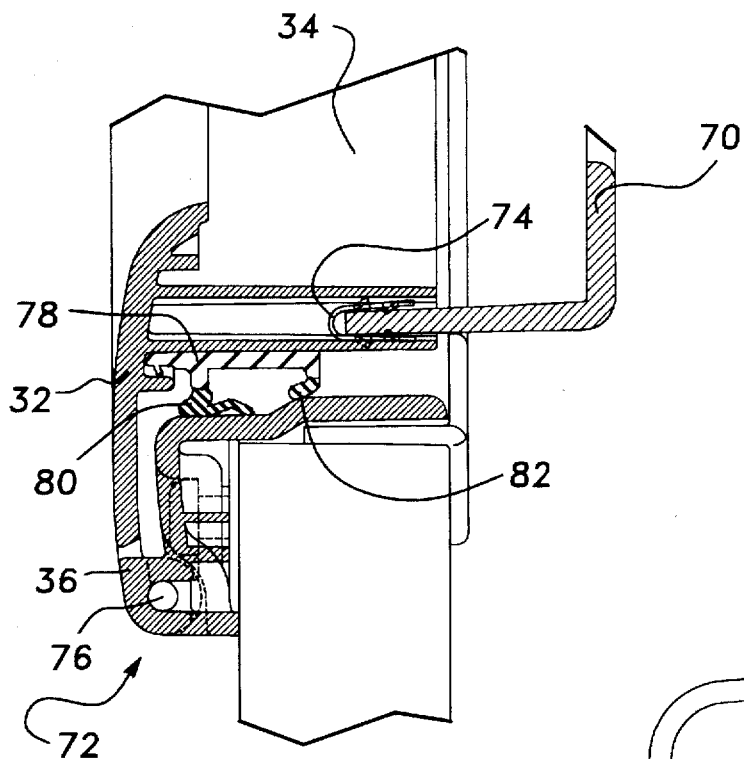
FIG. 7 is a fragmentary cross sectional view of the door panel, the hinge and the body frame before the inner door frame and outer door frame have tightly sandwiched the door wall.

FIG. 7 shows a cross sectional view of an incompletely assembled door assembly 20 in the vicinity of a hinge 72. Hinge 72 joins a portion of outer door frame 32 to a portion of outer body frame 36. Inner door frame 70 and outer door frame 32 are in the process of being joined by a retaining clip 74 whereby they will sandwich door wall 34. Inner door frame 70 has a tongue section which forms a tongue and groove joint when mated with the groove section of outer door frame 32. Retaining clip 74 is inserted between the tongue section of inner door frame 70 and the groove section of outer door frame 32 and is used to secure inner door frame 70 to outer door frame 32 when they are joined.

This view also shows how portions of outer door frame 32 and outer body frame 36 are joined by a hinge pin 76 to form hinge 72. The material used to manufacture hinge pin 76 has been purposely selected to allow hinge pin 76 to break away if destructive forces are placed on outer door frame 32, outer body frame 36 and hinge pin 76. The relatively inexpensive hinge pins 76 may then be replaced to repair door assembly 20 instead of requiring the replacement of the major components of door assembly 20, such as outer door frame 32 and outer body frame 36, if destructive loads are accidentally placed on door assembly 20.

This figure also shows that a seal 78 is attached to outer door frame 32 and comes into contact with outer body frame 36 when door assembly 20 is closed. Seal 78 has a body or backbone, manufactured from a material with a flexible but relatively firm consistency, such as normal rubber, and two spaced-apart flexible sections, an outer section 80 and an inner section 82, manufactured from a material having a more supple or pliable consistency, such as foamed cellular rubber. The seal having the two different seal materials is typically manufactured by a coextrusion process. The outer section 80 and inner section 82 of seal 78 forms two effective sealing surfaces when door assembly 20 is closed and seal 78 is compressed between outer door frame 32 and outer body frame 36. These separate sealing sections are important because they inhibit the passage of materials, such as water, dirt, insects, cargo, etc., in or out of the internal compartment when the door is closed. Inner seal 82 of seal 78 has a dog-legged shaped cross section biased away from the internal compartment within the recreational vehicle when seated against outer body frame 36. Outer section 80 of seal 78 has a main section with dog-legged shaped cross section biased away from the internal compartment and a supplemental flange section with an open C-shaped cross section facing outer body frame 36 and being connected to the bottom of the main section, when outer section 80 of seal 78 is seated against outer body frame 36.

Figure 8:
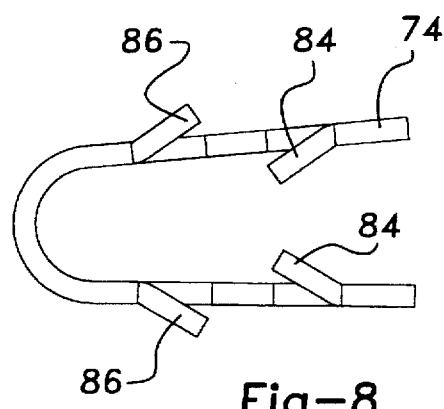
FIG. 8 is a side view of the retaining clip used to fasten the inner door frame to the outer door frame.

FIG. 8 is an enlarged side view of retaining clip 74 showing that retaining clip 74 has a body with a return bent upon itself shape and has pointed inner members 84 and pointed outer members 86. When inner door frame 70 and outer door frame 32 are mated, pointed inner members 84 and pointed outer members 86 embed themselves into inner door frame 70 and outer door frame 32, respectively, and prevent the relative movement of inner door frame 70 with respect to outer door frame 32. If retaining clip 74 is viewed from the opposite side, it presents a mirror image view of FIG. 8, because there are two additional pointed inner members 84 and two additional pointed outer members 86 located on the opposite side of retaining clip 74. Retaining clip 74 can be fabricated from any material that is both strong and flexible, such as spring steel.

Figure 9:
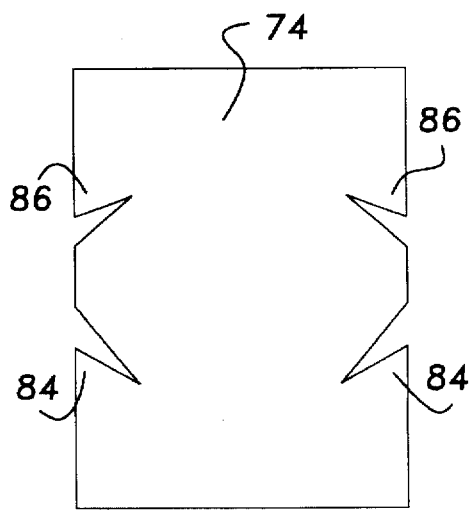
FIG. 9 is a top down view of the retaining clip from FIG. 8.

FIG. 9 is an enlarged top down view of retaining clip 74 showing pointed inner members 84 and pointed outer members 86 which are part of the top leg of retaining clip 74. This view shows that inner members 84 and outer members 86 are wedge shaped or triangular shaped portions that have been upset or displaced from the body of retaining clip 74. This view also shows that inner member 84 and outer member 86 located on each leg of retaining clip 74 are separated from the other inner member 84 and outer member 86 located on that leg, respectively, by the width of retaining clip 74. If retaining clip 74 was viewed from the bottom up, the view would be a mirror image of FIG. 9, because there are two similarly positioned additional pointed inner members 84 and two similarly positioned additional pointed outer members 86 located on the bottom leg of retaining clip 74.

Figure 10:
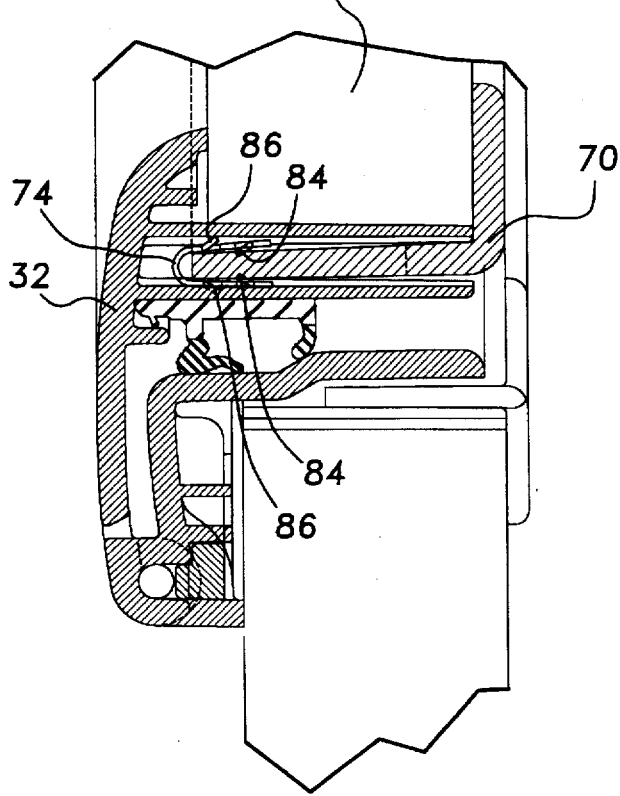
FIG. 10 is a fragmentary cross sectional view of the door panel, the hinge and the body frame from FIG. 7 after the inner door frame and the outer door frame have tightly sandwiched the door wall.

FIG. 10 shows a cross sectional view of door assembly 20 from FIG. 7 after inner door frame 70 and outer door frame 32 have been joined using retaining clip 74 and have tightly sandwiched door wall 34. Pointed inner members 84 are embedded in inner door frame 70 in four places, in two spaced-apart locations on the top of the tongue section of inner door frame 70 and in two spaced-apart locations on the bottom of the tongue section of inner door frame 70. Pointed inner members 84 inhibit inner door frame 70 from moving with respect to retaining clip 74. Pointed outer members 86 are embedded in outer door frame 32 in four places, in two spaced-apart locations on the top inner section of the groove section of outer door frame 32 and in two spaced-apart locations on the bottom inner section of the groove section of outer door frame 32. Pointed outer members 86 inhibit outer door frame 32 from moving with respect to retaining clip 74. In all four cases, the spaced-apart locations of pointed inner members 84 and pointed outer members 86 are separated by the width of retaining clip 74.

Figure 11:
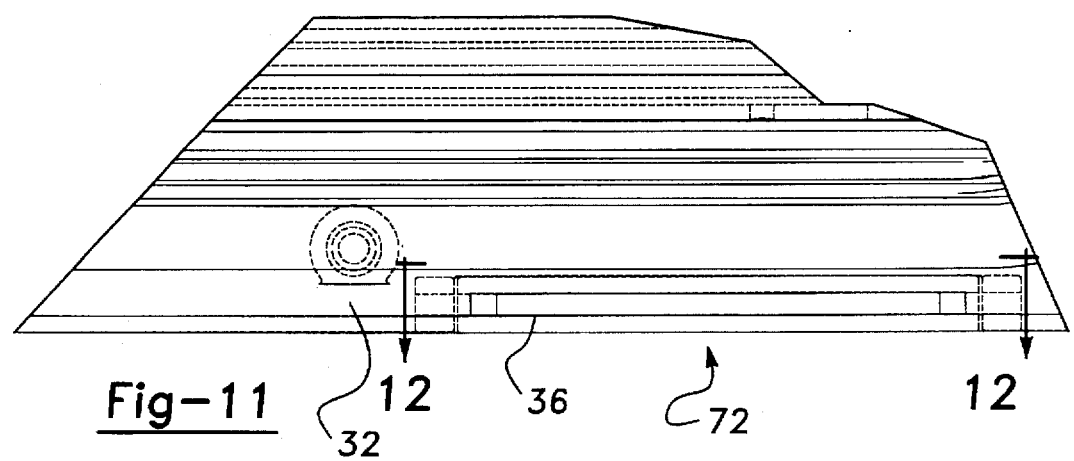
FIG. 11 is a fragmentary close up view of the door assembly in the vicinity of a hinge.

FIG. 11 is a fragmentary close up side view of the exterior of door assembly 20 in the vicinity of hinge 72. The largest component visible from this perspective is outer door frame 32. A small section of outer body frame 36 is also exposed in hinge area 72. This section of outer body frame 36 is the only section that is visible when door assembly 20 is closed.

Figure 12:
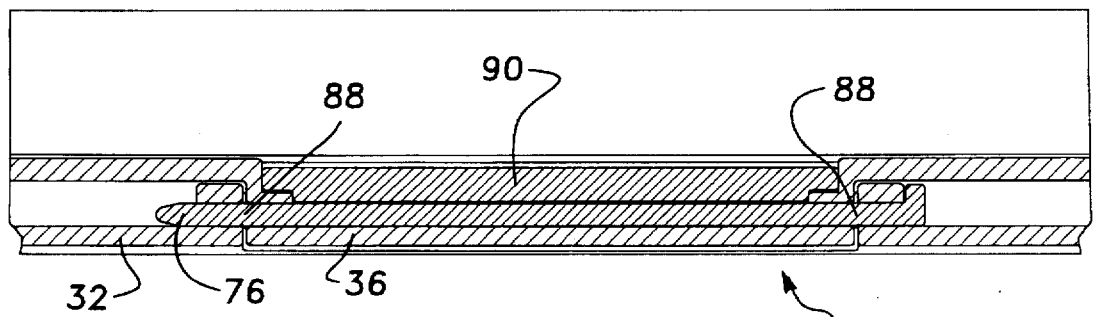
FIG. 12 is a fragmentary cross sectional top down view of the door assembly in the vicinity of a hinge.

FIG. 12 shows a cross sectional view of door assembly 20 through the center of hinge pin 76. Hinge pin 76 passes through portions of outer body frame 36 and outer door frame 32 and allows outer door frame 32 to rotate with respect to outer body frame 36. Hinge pin guide 88 attached to outer body frame 36 aids in the insertion of the hinge pin 76 during assembly and keeps hinge pin 76 in proper alignment. Hinge pin 76 has been intentionally constructed of material which allows it to break away (also referred to as shear away) if destructive forces are placed on outer door frame 32. Hinge pin 76 may also be scored where at the hinge interface surfaces 88 to reduce the cross sectional area of hinge pin 76 and therefore the shearing force required to break away hinge pin 76. To assure that hinge pin 76 can properly perform its intended break away function, it is important that hinge pins 76 be properly aligned with respect to outer door frame 32 and outer body frame 36 even when destructive forces are being placed on outer door frame 32. Hinge pin guide 90 inhibits hinge pin 76 from flexing, bowing or creeping in response to forces being place on outer door frame 32 and thus retains hinge pin 76 in proper position to be broken away if a sufficient destructive force load is placed on outer door frame 32.

As can be seen in this figure, hinge pin 76 is completely surrounded by outer door frame 32 and outer body frame 36 when door panel 42 is closed. This significantly increases the security of door assembly 20 when the door is locked. If a thief attempted to force open locked door assembly 20 and attempts to pry the door open failed (as discussed above), an logical alternative method for attempting to open door assembly would be to attack the hinges. If the hinge pins in a door assembly are exposed, a tool such as a punch or screwdriver could be used with a hammer to force the hinge pins out of the door assembly. In the inventive door assembly, hinge pins 76 are completely covered when door panel 42.

Figure 13:
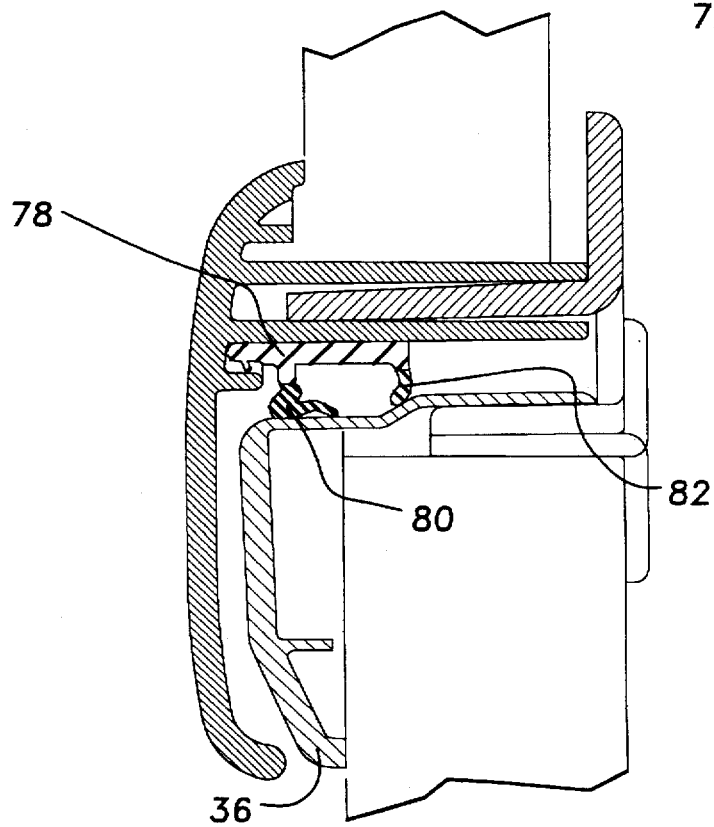
FIG. 13 is a fragmentary cross sectional side view of the body frame and the door panel which illustrates how the seal conforms itself to the inner surface of the body frame.

FIG. 13 is a cross sectional view of a corner of the completed and installed door assembly 20. This figure demonstrates how seal 78 closely conforms itself to and flattens itself against the surface of outer body frame 82 even when the mating surface of outer body frame 82 is curved or not precisely equidistant from the adjacent surface of outer door frame 32.

It is to be understood that the invention is not limited to the exact construction illustrated and described above, but that various changes and modifications may be made without departing from the spirit and scope of the invention as defined in the following claims.

We claim:

1. A door assembly for a recreational vehicle having a side wall with a cutout and an internal compartment, for alternatively providing and closing off access to said internal compartment, said door assembly comprising:

a body frame, a door panel positioned within said body frame, said door panel being movable between an open position and a closed position, a one piece seal member surrounding said door panel having inner and outer spaced-apart flexible sections so that said inner and outer spaced-apart flexible sections are compressed between said door panel and said body frame when said door panel is placed in said closed position, said inner flexible section being a dog-legged shaped cross section biased away from said internal compartment and said outer flexible section being a dog-legged shaped cross section biased away from said internal compartment connected to a flange section having an open C-shaped cross section facing said body frame, when said door panel is placed in said closed position.

2. A door assembly for a recreational vehicle having a side wall with a cutout and an internal compartment, for alternatively providing and closing off access to said internal compartment, said door assembly comprising:

a body frame, a door panel, including an inner door frame, an outer door frame and a door wall, said door panel being movable between an open position and a closed position, said inner door frame and said outer door frame having mated tongue and groove sections, retaining means between said tongue section and said groove section operable to secure said inner door frame to said outer door frame in response to movement of said inner door frame and said outer door frame into said mated relationship.

3. A door assembly according to claim 2 wherein said retaining means is a retaining clip having a body with a return bent upon itself shape, and a pointed inner member and a pointed outer member operable to embed themselves into said inner door frame and said outer door frame in response to movement of said inner door frame and said outer door frame into said mated relationship, to prevent the relative movement of said inner door frame with respect to said outer door frame.

4. A door assembly according to claim 3, said retaining clip further incorporating additional pointed inner members and additional pointed outer members, so that said pointed inner members of said retaining clip collectively embed themselves in two spaced-apart locations on the top of said tongue section and in two spaced-apart locations on the bottom of said tongue section and said pointed outer members of said retaining clip collectively embed themselves in two spaced-apart locations on the top inner surface of said groove section and in two spaced-apart locations on the bottom inner surface of said groove section when said inner door frame and said outer door frame are moved into said mated relationship.

5. A door assembly for a recreational vehicle having a side wall with a cutout and an internal compartment, for alternatively providing and closing off access to said internal compartment, said door assembly comprising:

a body frame, a door panel, positioned within said body frame, a hinge, joining a hinge section of said body frame to a hinge section of said door panel, so that said door panel can be moved between an open position and a closed position, said hinge section of said body frame and said hinge section of said door panel being flush with or recessed from the most protruding section of said door panel and said body frame other than said hinge section of said door panel and said hinge section of said body frame.

6. A door assembly according to claim 5 further including a hinge pin which is completely encased by said door panel and said body frame when said door panel is closed.

7. A door assembly according to claim 6 wherein said hinge pin breaks away prior to said hinge section of said door panel and said hinge section of said body frame when equivalent destructive loads are placed on said hinge pin, said hinge section of said door panel and said hinge section of said body frame.

8. A door assembly according to claim 7 wherein said hinge pin is scored where said hinge section of said door panel is joined to said hinge section of said body frame by said hinge pin.

* * * * *